United States Patent
Lorin et al.

(10) Patent No.: US 6,625,263 B1
(45) Date of Patent: Sep. 23, 2003

(54) METHOD, DEVICE FOR DETECTING THE CALLING OF A TELEPHONE AND MODEM INCLUDING SUCH A DEVICE

(75) Inventors: Christophe Lorin, Grenoble (FR); Bertrand Bruder, Düttlenheim (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/467,404

(22) Filed: Dec. 20, 1999

(30) Foreign Application Priority Data

Dec. 31, 1998 (FR) .............................................. 98 16740

(51) Int. Cl.⁷ .......................................... H04M 11/00
(52) U.S. Cl. .................................. 379/93.09; 379/93.28
(58) Field of Search .......................... 379/93.09, 90.01, 379/93.28, 106.08, 377

(56) References Cited

U.S. PATENT DOCUMENTS

| | | | | |
|---|---|---|---|---|
| 4,958,371 A | * | 9/1990 | Damoci et al. ............. | 379/377 |
| 5,140,631 A | | 8/1992 | Stahl ........................... | 379/377 |
| 5,422,939 A | * | 6/1995 | Kramer et al. .............. | 379/107 |
| 5,506,891 A | * | 4/1996 | Brown ......................... | 379/97 |
| 6,134,321 A | * | 10/2000 | Pitsch ........................ | 379/399 |
| 6,215,855 B1 | * | 4/2001 | Schneider ..................... | 379/22 |
| 6,292,546 B1 | * | 9/2001 | Gayrard ..................... | 379/93.09 |

FOREIGN PATENT DOCUMENTS

EP 0338654 10/1989 .......... H04M/11/06

* cited by examiner

*Primary Examiner*—Stella Woo
(74) *Attorney, Agent, or Firm*—Joseph S. Tripoli; Harvey D. Fried; Joseph J. Kolodka

(57) ABSTRACT

The invention relates to a digital device for detecting the hold by an apparatus of a telephone line into which is plugged a modem employing band superposition transmission, the modem sending a send signal on the telephone line and receiving from this line a digitized reception signal, characterized in that the said device comprises:

a means for providing a parameter of the transfer function of the send signal on the reception signal, the said parameter being characteristic of the presence of at least the said apparatus on the line, control means for controlling the interruption of the exchanges of signals of the modem on the line, the said control being dependent on the said parameter of the transfer function.

The invention also relates to the method implemented by the device of the invention, a modem comprising this device and a server of an Internet access provider using such a modem.

11 Claims, 6 Drawing Sheets

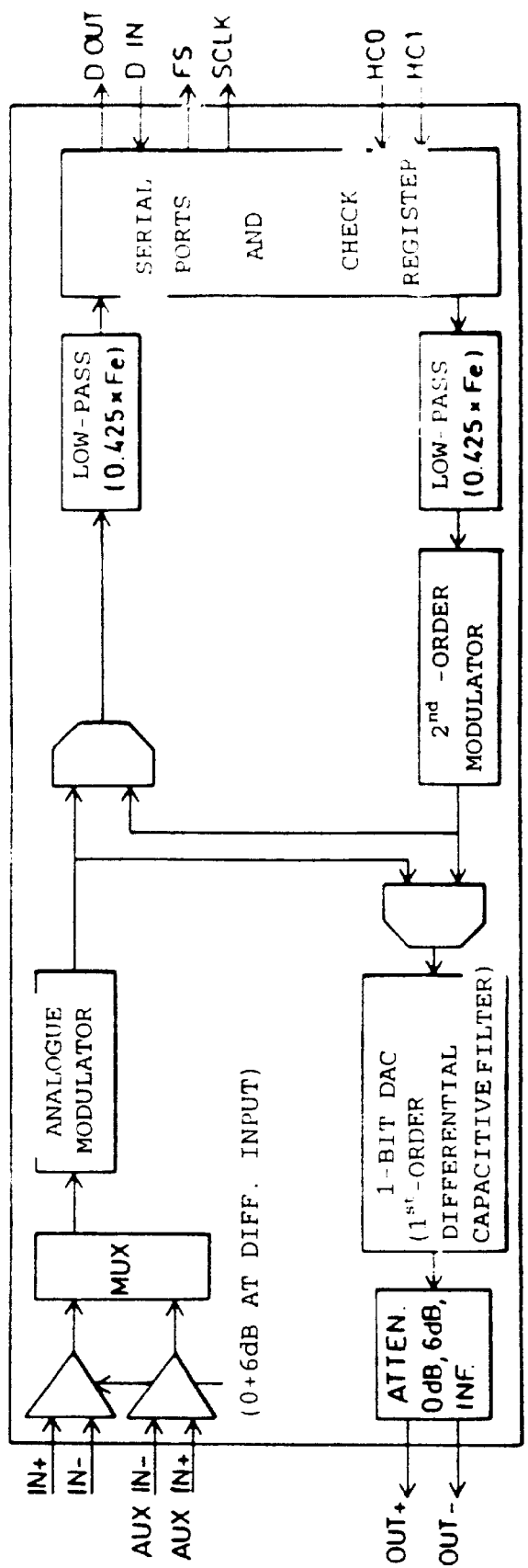
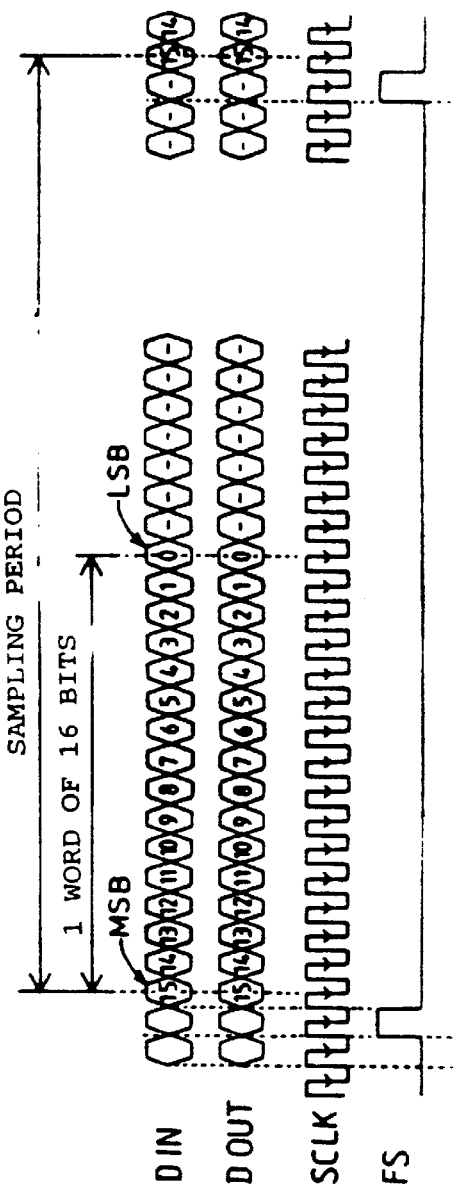
FIG.8
FIG.9

METHOD, DEVICE FOR DETECTING THE CALLING OF A TELEPHONE AND MODEM INCLUDING SUCH A DEVICE

FIELD OF THE INVENTION

The invention pertains to a digital device for detecting the hold by an apparatus of a telephone line into which is plugged a so-called duplex band superposition transmission modem. It also relates to a band superposition transmission modem.

BACKGROUND OF THE INVENTION

A band superposition transmission modem makes it possible, by superposition, to send and receive data, generally digital, simultaneously in the same frequency band, travelling through telephone lines.

For the sending or receiving of data, it is common to use telephone lines which are used moreover for other uses such as customary telephone communications. Such are thus, in particular, television decoders.

These decoders can be linked automatically, by way of the modem, to a program provider without the user of the telephone line being informed of the moment of the communication.

In general, so as not to disturb the common use of the telephone line, the modem must be such that it gives priority to telephone communications, that is to say that, if the modem occupies the line, it must disconnect itself if the user seeks to use the line.

Now, present-day modems employing band superposition transmission do not have any device for detecting line hold so as to be able to assign such priority.

SUMMARY OF THE INVENTION

The aim of the present invention is in particular to remedy this major drawback.

To this end, the subject of the invention is a digital device for detecting the hold by an apparatus of a telephone line into which is plugged a modem employing band superposition transmission, the modem sending a send signal on the telephone line and receiving from this line a digitized reception signal, characterized in that the said device comprises:

a means for providing a parameter of the transfer function of the send signal on the reception signal, the said parameter being characteristic of the presence of at least the said apparatus on the line,
 control means for controlling the interruption of the exchanges of signals of the modem on the line, the said control being dependent on the said parameter of the transfer function.

Thus, the user of the telephone line desiring to use the latter is not disturbed by the modem. Moreover, because it is totally digital, the device of the invention makes it possible to carry out an accurate estimation of the transfer function insofar as the signals are not affected by temperature drifting.

Advantageously, the said means for providing the parameter of the said transfer function comprises a processor implementing a step of estimating the static gain of the transfer function K and a step of determining the sign of the estimated static gain. Thus, the said steps of estimation and of determination can be performed by a program installed in a processor generally located in the modem or in any associated decoder.

According to one embodiment, the step of estimating the static gain of the transfer function comprises a step of calculating the coefficients of the transfer function implementing an identification algorithm of the Kalman or RLS type or the method of least squares.

According to one embodiment, the device according to the invention includes a means for disconnecting the modem from the line when the said device sends an indication signal that the line is requested by the apparatus plugged in in parallel.

The subject of the invention is also a band superposition transmission modem, characterized in that it includes a detection device according to the invention.

The subject of the invention is also a server of an Internet network access provider, characterized in that it comprises a device according to the invention or a modem according to the invention.

The subject of the invention is also a method of detecting the hold by an apparatus of a telephone line into which is plugged a modem employing band superposition transmission, the modem sending a send signal on the telephone line and receiving from this line a digitized reception signal, characterized in that the said method includes the following steps:

a step for providing a parameter of the transfer function of the send signal on the reception signal, the said parameter being characteristic of the presence of at least the said apparatus on the line,
 a control step for controlling the interruption of the exchanges of signals of the modem on the line, the said control being dependent on the said parameter of the transfer function.

According to one embodiment, the step for providing the parameter of the transfer function of the send signal on the reception signal comprises a step of estimating the static gain of the transfer function and a step of determining the sign of the estimated static gain.

According to one embodiment, the step of estimating the static gain of the transfer function comprises a step of calculating the coefficients of the transfer function implementing an identification algorithm of the Kalman or RLS type or the method of least squares.

According to one embodiment, the method of detection is performed continuously during the phase of modem data exchange with the telephone line.

BRIEF DESCRIPTION OF THE DRAWINGS

Other characteristics and advantages of the present invention will emerge from the description of the example embodiments which follow, taken by way of nonlimiting examples, with reference to the appended figures in which:

FIG. 8 represents an embodiment of the codec of FIG. 6, FIG. 9 represents a timing diagram illustrating the profile of the input and output signals of the codec over a sampling period during the transfer of a data word.

DETAILED DESCRIPTION OF PREFERED EMBODIMENT

To simplify the description, the same references will be used to designate elements fulfilling identical functions.

Figure 1:
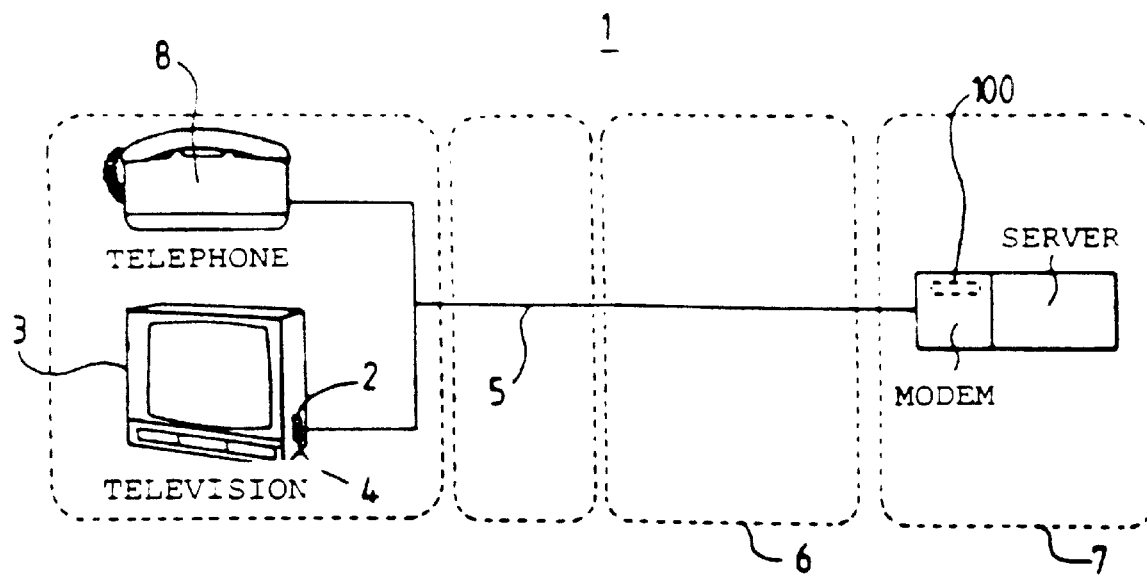
FIG. 1 is a diagram showing a use of a modem according to the invention.

Represented in FIG. 1 is a system 1 for downloading within the framework of television referred to as "interactive television".

For reception, a decoder 2 integrated into a television 3 of the user receives signals through an antenna, not represented, picking up a transmission provided by a satellite (not represented).

The receiving of the television transmissions, or of other data provided by the satellite, is subject to authorization which is communicated through a telephone line 5 to which the said modem 4 is linked. This telephone line 5 caters for interactivity between the programmes received and the user. It puts in touch, via an operator network 6 using digital transmission, a telephone server 7 with the decoder 2 by way of the modem 4.

The communication between the decoder 2 and the server 7 takes place in both directions. The decoder 2 can automatically establish a communication with the server 7, for example to request a particular programme and, conversely, the server 7 can automatically send information to the decoder 2, for example to give authorization to receive a television programme.

Given that in general, the telephone line 5 is used at the same time for other applications, such as customary telephone communications or telefaxes, it is necessary for the automatic communication between the server 7 and the decoder 2 not to disturb the operation of telephone handsets 8 or other apparatuses of the subscriber. To this end, there is provision for a device for detecting telephone line hold and a means for interrupting the communication between the decoder 2 and the server 7 when another use of the line 5 is requested, or the decoder 2 is prevented from seizing or requesting the line when the latter is busy.

Conversely, when the use of the line is no longer required, the decoder is provided with a means for resuming the interrupted communication.

Figure 2:
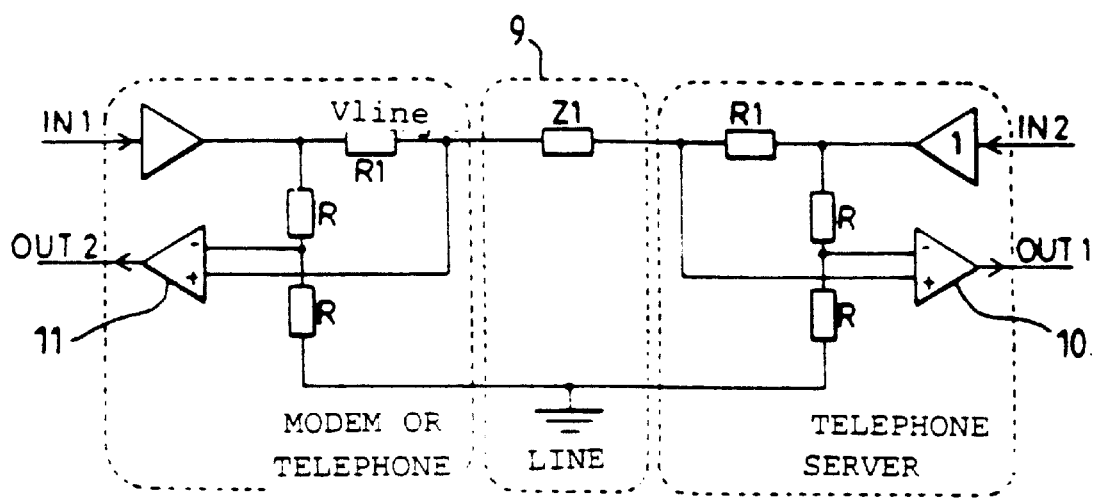
FIG. 2 diagrammatically represents a subscriber loop in an architecture of a telephone network comprising an apparatus linked to a telephone line connected to a server.

FIG. 2 diagrammatically represents a subscriber loop in an architecture of a telephone network. Depicted therein is a link between an apparatus of a user, which can be the modem 4 or the telephone 8, and the telephone server 7 via a transmission line 9 representing the telephone line 5 and the network 6 and defined by an impedance $Z_l$.

It should be noted, in what follows, that the model used in the present description is resistive whereas, in reality, the transmission line has losses. However, the resistive approximation is always used in electronic telephones connected to the switched network. The results obtained according to this approach have proved to be amply satisfactory for defining the detection device according to the invention and its validity for solving the problem posed.

In FIG. 2, the user sends a signal In1 and receives a signal Out2 through the transmission line 9. The signals, In1 and Out2 travel simultaneously over the transmission line. Each signal received Out1 (signal received by the server), Out2 is extracted from the transmission band with the aid of subtractors 10, 11, retaining only the useful part of the signal.

Figure 3:
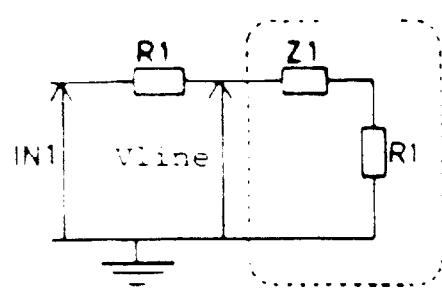
FIG. 3 represents the equivalent diagram for an apparatus linked to the server.

FIG. 3 represents the equivalent diagram for an apparatus (modem 4 or telephone 8) linked to the server 7 replaced by its input impedance R1. The impedance R1 of the set sees the impedance $Z_l$ of the line and the impedance R1 of the server. By considering the input impedance R1 of the server, the voltage $V_{line}$ across the terminals of the line 9 is:

$$V_{Line} = In1 \frac{Zl + R1}{Zl + 2R1}$$

From this is deduced in succession:

$$Out2 = V_{Line} - \frac{1}{2} In1^{20}$$

$$\frac{Out2}{In1} = \frac{Zl}{2(2R1 + Zl)} \geq 0$$

Consequently, the gain $$\frac{Out2}{In1}$$

is always positive, regardless of the impedance $Z_l$.

Figure 4:
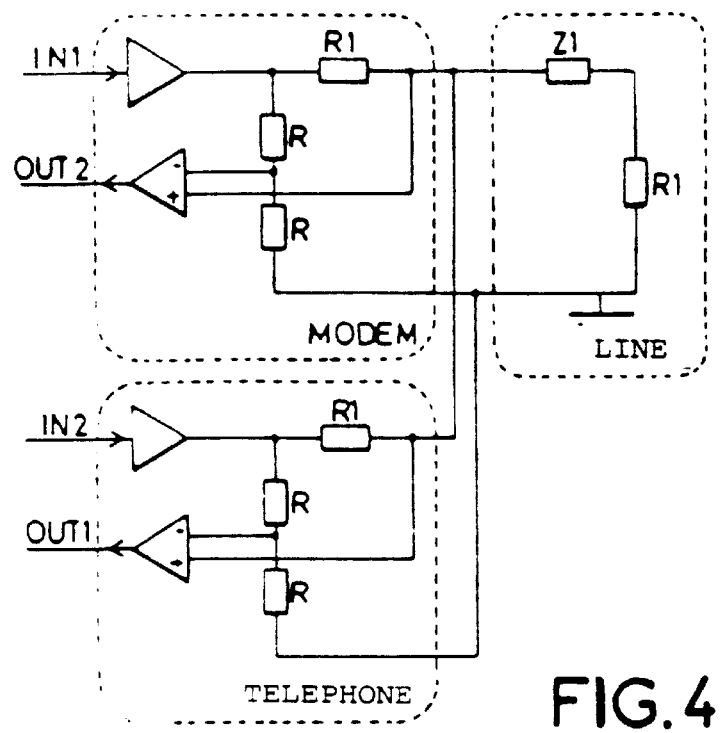
FIG. 4 represents two sets in parallel linked to the telephone line.

FIG. 4 represents the connection of two phone sets in parallel, such as the modem 4 and the telephone 8, on the line 5. The input/output voltages In1, Out2 relate to the modem 4 whilst the input/output voltages In2, Out1 are those of the telephone 8.

Figure 5:
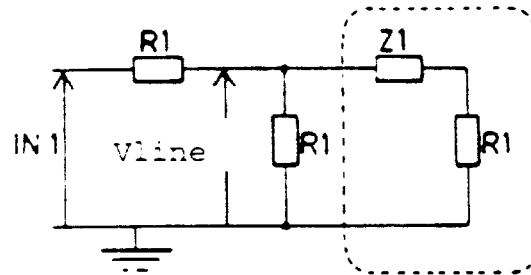
FIG. 5 is an equivalent diagram of a modem linked to the line whilst a telephone is off-hook, FIG. 6 diagrammatically represents a subscriber loop comprising an embodiment of a modem according to the invention and illustrating a processor, an interface and a coder/decoder commonly referred to as a codec.

By considering that In2=0, the modem sees the impedance R1 of the telephone 8 added in parallel with the impedance of the line, as shown by the diagram of FIG. 5.

We then have:

$$V_{Line} = In1 \frac{Zl + R1}{2Zl + 3R1}$$

Whence:

$$\frac{Out2}{In1} = \frac{-R1}{6R1 + 4Zl} \leq 0$$

This gain is negative regardless of $Z_l$.
The sign of the gain of the transfer function $$\frac{Out2}{In1}$$

will therefore provide evidence of the simultaneous connection of at least one set in parallel.

Figure 6:
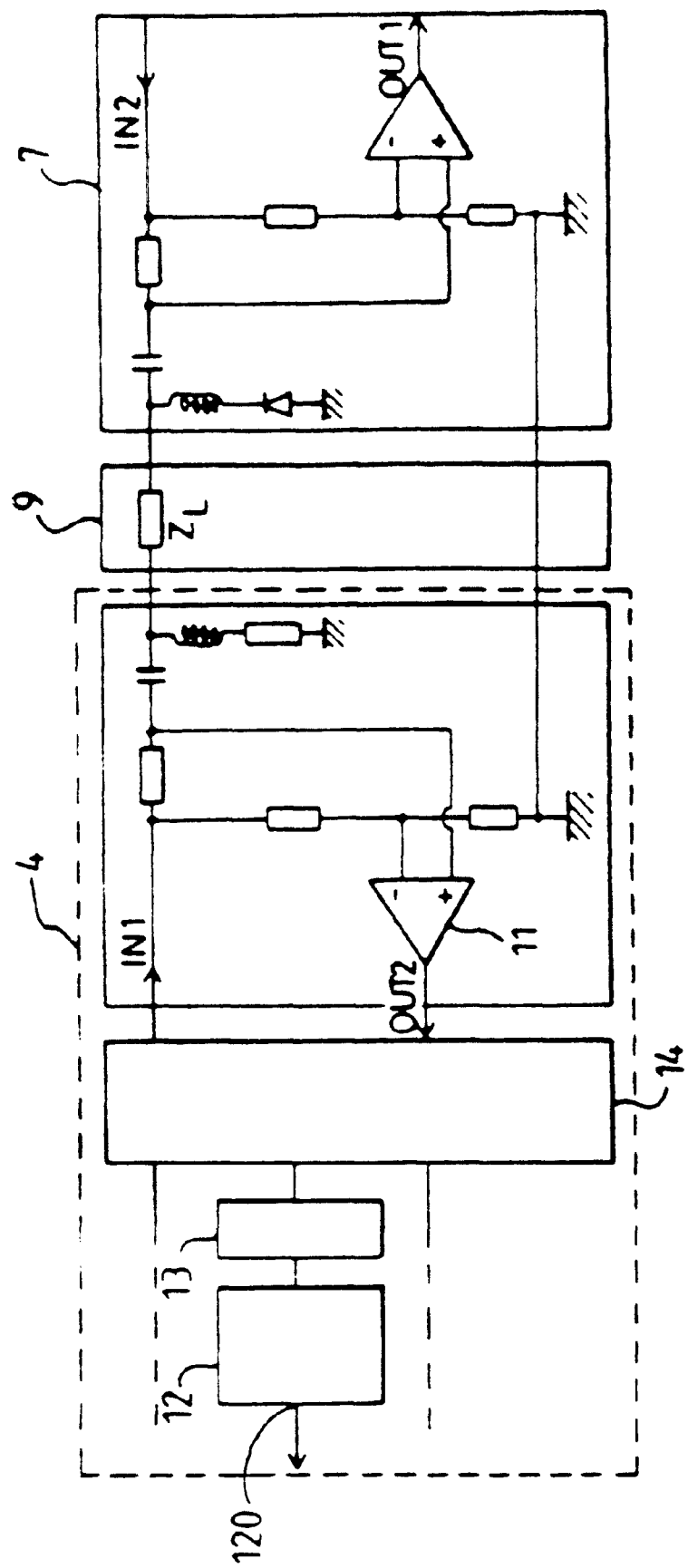

FIG. 6 diagrammatically represents a subscriber loop including an embodiment of a detection device 12 according to the invention in the modem 4.

In the present preferred embodiment of the invention, the detection device is a processor 12 implementing an identification algorithm based, for example, on the method of least squares, the RLS algorithm or the Kalman algorithm, as specified hereinbelow.

As may be seen in FIG. 6, the processor 12 is linked to an interface 13 linked with a codec 14. The manner of operation of these latter will be detailed below. The signal IN1 sent by the codec is transmitted over the line 9. The signal OUT2 received by the codec 14 originates from the output of the subtractor 11 filtering the signals intended to be received by the modem in the transmission band. An output 120 is an output for controlling the hanging up of the telephone line. It should be noted that FIG. 6 diagrammatically represents the connections between the various elements. The subsequent figures and their respective descriptions will better elucidate these connections.

During operation, the processor 12 calculates an estimated value of the transfer function K of the transmission line 9. This value is calculated on the basis of the digitized values of the signals sent and of the signals received by the modem. The correlation between the signals In1 and Out2 is characterized by the sampled transfer function K(z), Tx and Rx respectively representing the digitized signals In1 and Out2. K(z) will be modelled in the form of a rational fraction whose order will be chosen to be small so as to reduce the calculation time:

$$\frac{Rx(z)}{Tx(z)} = K(z) = \frac{a_0 + a_1 z^{-1} + \cdots + a_{na} z^{-na}}{1 + b_1 z^{-1} + \cdots + b_{nb} z^{-nb}} + C^{te}$$

Use is then made of an identification algorithm implementing a least squares algorithm, the RLS algorithm or the Kalman algorithm for calculating the coefficients $a_i$ and $b_i$. According to the present example, the algorithm chosen is based on the method of BIERMAN using a Kalman filter. Such a method is detailed in the work "Filtrage et lissage statistiques optimaux lineaires" [linear optimal statistical filtering and smoothing] by J. C. Radix, published by Cepadues. By carrying out series of measurements of Rx and Tx, the chosen algorithm solves the system of difference equations deduced from the above equation:

$$Rx_k = a_0 Tx_k + a_1 Tx_{k-1} + \ldots + a_{na} Tx_{k-na} - b_1 Rx_{k-1} - \ldots - b_{nb} Rx_{k-nb} + \text{offset} + v$$

where v represents measurement noise of zero mean and constant variance r.

The tests performed with this model have made it possible to observe the behaviour of the static gain of the transfer function K: its sign makes it possible to detect the presence of one or more sets in parallel.

The above equation can be cast into matrix form:

$$Rx_k = A_k^t X_k + v$$

With $$A_k = \begin{pmatrix} Tx_k \\ \vdots \\ Tx_{k-na} \\ -Rx_{k-1} \\ \vdots \\ -Rx_{k-nb} \\ 1 \end{pmatrix} \text{ and } X_k = \begin{pmatrix} a_0 \\ \vdots \\ a_{na} \\ b_1 \\ \vdots \\ b_{nb} \\ \text{offset} \end{pmatrix}$$

Moreover, we define:
- $U_k$: upper triangular matrix with unit diagonal $U_k = (U_k^1 \cdots U_k^{na+nb+2})$,
- $D_k$: diagonal matrix $D_k = \text{diag}(d_k^1, \cdots, d_k^{na+1})$ Initialization $$\begin{cases} F = U_k^t A_k = \begin{pmatrix} f_1 \\ \vdots \\ f_{na+nb+2} \end{pmatrix} \quad V = D_k F = \begin{pmatrix} v_1 \\ \vdots \\ v_{na+nb+2} \end{pmatrix} \quad K_1 = \begin{pmatrix} v_1 \\ 0 \\ \vdots \\ 0 \end{pmatrix} \\ \alpha_1 = r + v_1 f_1 \qquad U_k^1 = U_{k-1}^1 \qquad d_k^1 = \frac{d_{k-1}^1 r}{\alpha_1} \end{cases}$$

For j from 2 to (na+nb+2):

$$\begin{cases} \alpha_j = \alpha_{j-1} + v_j f_j \\ d_k^j = d_{k-1}^j \frac{\alpha_{j-1}}{\alpha_j} \\ U_k^j = U_k^j - \frac{f_j}{\alpha_{j-1}} K_{j-1} \\ K_j = K_{j-1} + v_j U_{k-1}^j \end{cases}$$

Whence the following estimate of the matrix of coefficients X:

$$X_k = X_{k-1} + \frac{K_{na+nb+2}}{\alpha_{na+nb+2}} (Rx_k - A_k^t X_{k-1})$$

Preferably, we adopt the order na=nb=3 in the numerator and in the dominator.

According to one embodiment, quadrature amplitude modulation (QAM) signals or pulse amplitude modulation (PAM) signals allow the static gain of the transmittance K to converge rapidly to a fixed value. Specifically, the static gain converges to a fixed value after around 65 measurements, this corresponding to a reaction time of less than one second.

Figure 7:
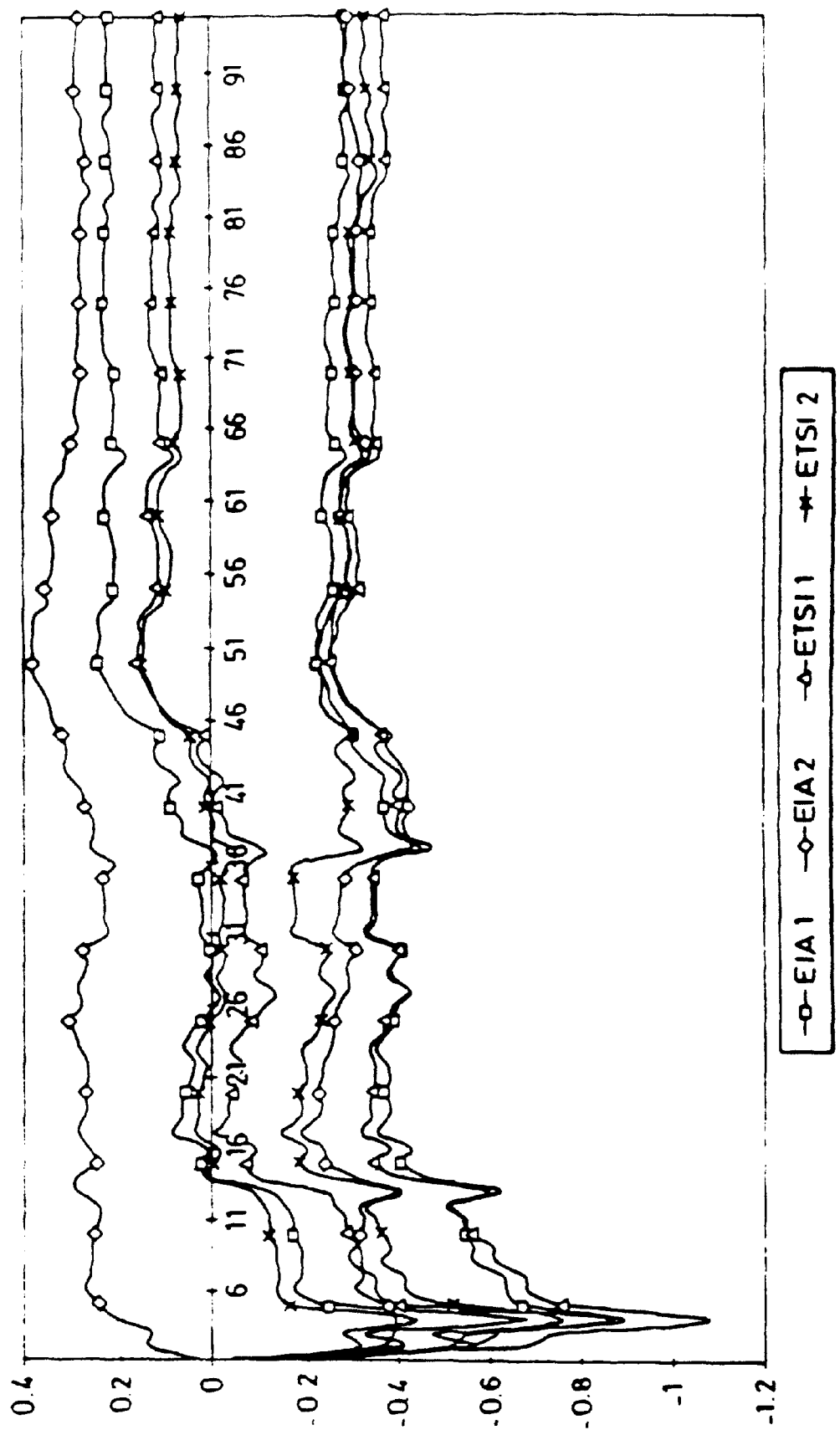
FIG. 7 represents the static gain of the transfer function K representing the ratio of the voltages sent and received by the modem, in the course of time, as a function of the type of telephone line used.

The graph of FIG. 7 represents, in this configuration, various static gains of the transfer function K, in the course of time, as a function of the type of telephone line. The terms EIA1, EIA2, ETSI1, ETSI2 are standardized references of various types of telephone lines.

Represented are curves converging to positive values of static gain when the modem alone is on the line, whilst others converge to negative values of static gain when an apparatus is connected in parallel with the modem.

After around sixty-five measurements, the value of the gain makes it possible to identify with certainty the presence or otherwise of an apparatus.

Thus, the present invention makes it possible to reveal an order of the transfer function K such as na=3 and nb=3 which provides a static gain whose sign allows the problem posed to be addressed with certainty with a reaction time of an order of magnitude of less than a second.

Coder/Decoder

FIG. 8 represents an embodiment of the codec 14 of FIG. 6 and diagrammatically shows the journey of the signals through this codec. It will be possible, as an example of this codec, to take the reference component STLC7550 manufactured by the company STMicroelectronics. Such a codec is typically used in modem systems requiring transfer rates of up to 56 kbps (Kilobits per second). The interface 13 for interconnecting the codec to the processor 12 must be appended thereto.

This codec is inserted onto a card (not represented) making it possible to manage access to the telephone line.

The codec is made up of Digital/Analogue and Analogue/Digital converters which make it possible to convert signals heading for/coming from the telephone line. The card onto which the codec is inserted is in charge of adapting the analogue signals of the codec heading for the telephone line, as well as of fixing the sampling frequency of the converters.

For the reception of a signal: after extracting the useful signal at the reception end of the telephone line, this signal is firstly filtered with a first-order analogue filter and then sent on one of the analogue inputs of the codec (IN+, IN– or AUXIN+, AUXIN– as the case may be). This signal is sampled and then filtered with the aid of digital filters. The digitized signal is then available at the output of the codec on a serial port.

For the sending of a signal: the digital signal to be sent originates from a second serial port of the codec. This signal will be converted with an order 1 one-bit Digital/Analogue converter. The analogue signal obtained will be filtered with the aid of a Nyquist filter. This signal is ready to be sent on the telephone line.

The signals useful in the application are detailed below. For further information about the collection of signals, reference may be made to the complete documentation of the reference component STLC7550 manufactured by STMicroelectronics taken as an example.

SCLK: Clock for synchronizing the bits in a data word. This signal is generated internally in the codec.

FS: Synchronization of a data word. The frequency of appearance of FS is a multiple of SCLK.

DIN: Data bits to be sent on the telephone line.

DOUT: Data bits received from the telephone line.

HC1, HC0: Choice of operating mode.

TKL1: Line hold.

RI: Detection of ringing.

RESET/: Initialization of the codec in a default configuration.

PWRDWN: Placing codec on standby.

FIG. 9 represents a timing diagram illustrating the profile of the input and output signals of the codec over a sampling period during the transfer of a data word.

The codec is synchronized with the aid of a quartz (not represented), outside the codec, of frequency 36.864 Mhz which will generate the clock SCLK. This clock serves to synchronize the arrival of the data bits on the output DOUT and the input DIN. The quartz will also generate the sampling frequency FS of the converters. FS will therefore serve to synchronize the arrival of the data words (1 word=16 bits) on the output DOUT and the input DIN. Between two pulses of FS, the number of clock periods SCLK is greater than 128. A configuration register inside the codec (modifiable as a function of the mode of operation of the codec defined by HC0 and HC1) defines the frequency of appearance of the pulse FS following the desired transmission frequency.

The Processor

The processor has, in the present embodiment, an architecture of RISC type.

The interface 13 will be viewed, from the processor's viewpoint, as a memory whose addressing lies in the 16-bit static memory plane. The signals and the cycles of the processor will therefore be those corresponding to this type of memory.

Signals for Managing the Inputs/Outputs: Access to the modem will be treated as conventional access to memory. The signals which are useful for comprehension are:

A[21 . . . 0]: Address bus,

D[15 . . . 0]: 16-bit data bus

OEB: Output Enable (active in the low state),

WEB: Write Enable (active in the low state),

CS-IO16B: Chip select (active in the low state),

IRQ_NET: Interrupt signal.

Figure 10:
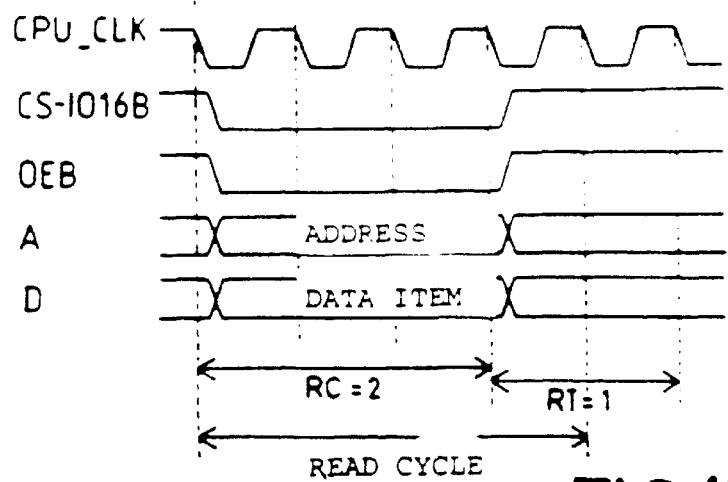
FIG. 10 represents the timing diagram of the read cycle for reading a data item contained in one of the registers of the interface.

FIG. 10 represents the timing diagram of the read cycle for reading a data item contained in one of the registers of the interface. This sequence is generated with the aid of an instruction for reading a 16-bit data item.

The signals and constants of FIG. 10 are explained below:

CPU_CLK: Internal clock of the processor,

CS-IO16B: Select interface, active at the low level (Chip Select),

OEB: Interface read instruction, active at the low level (Output Enable),

A: Address Bus,

D: Data bus,

RC: Time for validation of the data item on the basis of the Chip Select indication, RT: Time to deselect the memory bus after the read cycle.

The parameters RC and RT are chosen while making allowance for the interface access times.

Figure 11:
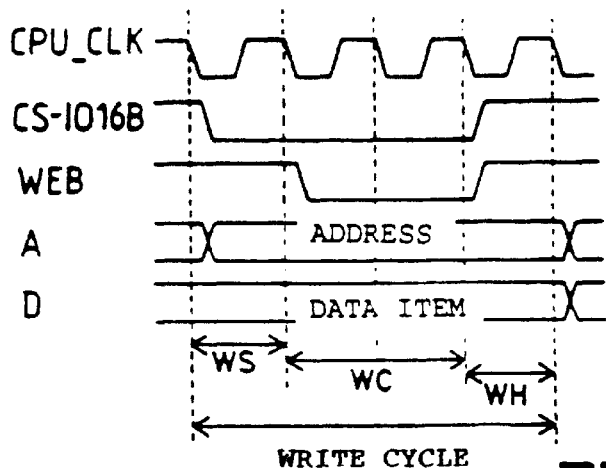
FIG. 11 represents the timing diagram illustrating the write cycle for writing a data item into one of the registers of the interface.

FIG. 11 represents the timing diagram illustrating the cycle for writing a data item to one of the registers of the interface. This sequence is generated with the aid of an instruction for writing a 16-bit data item.

The signals and constants of FIG. 11 are explained below:

CPU_CLK: Internal clock of the processor,

CS-IO16B: Select interface, active at the low level (Chip Select),

WEB: Interface write instruction, active at the low level (Write Enable),

A: Address Bus,

D: Data bus,

WS: Setup time for the address before WEB enable,

WC: WEB enable width,

WH: Hold time for the address after WEB disable.

The parameters WS, WC and WH are chosen while making allowance for the interface access times.

The Interface

The codec and the processor detailed above are linked with the aid of the interface 13.

Figure 12:
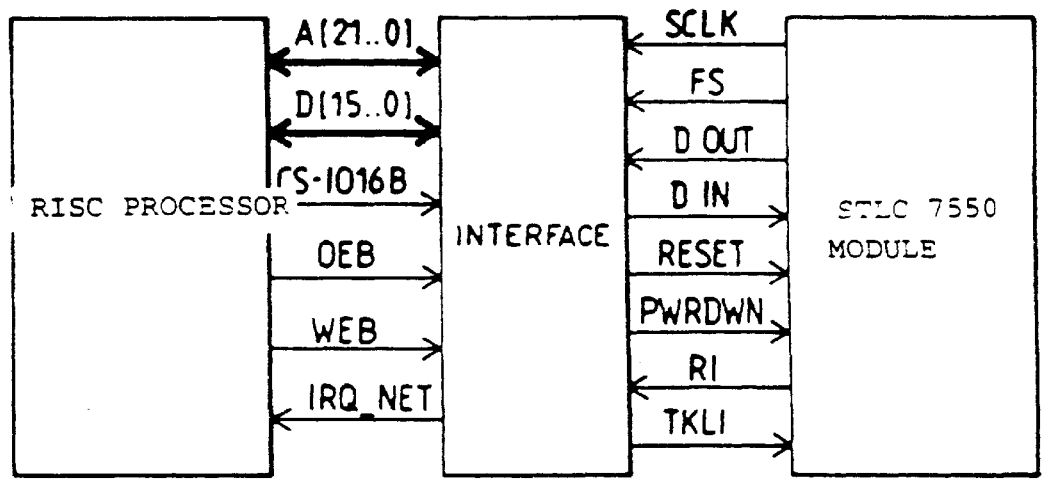
FIG. 12 illustrates the exchanges of signals between the processor and the codec.

FIG. 12 illustrates the exchanges of signals between the processor and the codec.

The interface is synchronized on the clock SCLK and on the sampling frequency FS. Two buffer registers make it possible temporarily to store the next data item to be sent (register Tx) and the last data item received (register Rx).

The arrival of a pulse of FS causes on the one hand the successive recording of the 16 data bits in Rx arriving from DOUT, then the sending of the 16 data bits, contained in the register Tx, through DIN. The interrupt signal IRQ_NET is then enabled. This interrupt alerts the processor that a new data item is available and that the codec is ready to send another one. The processor must then access the interface so as to read the new data item contained in Rx as well as to write the next data item to be sent into Tx. The same procedure recommences at the next pulse of FS.

Design of the Interface: the logic functions of the interface are catered for by a programmable component. For example, it will be possible to take the programmable component PLD with the registered trademark Altera.

The method of detection described above implements an estimation of the static gain of the transfer function K. It is however possible to perform a detection by a measurement of average power, preferably by sampling, at a given frequency.

Of course, the embodiments described above are not limiting.

Specifically, according to another particularly beneficial embodiment represented dashed in FIG. 1, the device according to the invention 100 is integrated into the server of an Internet network access provider, and preferably into the modem of this access provider of V90 type architecture in particular. This embodiment has the considerable advantage of making it possible to disconnect a user from the line plugged into the Internet during a telephone call, this disconnection being performed from the server and not requiring the user to possess a device according to the invention in his own modem. Certainly, furthermore, in this context, the device according to the invention can have, in the modem of the server and the interface inter alia, a different structure and different manner of operation than the embodiment described in detail in the present patent application.

What is claimed is:

1. Method of detecting a hold by an apparatus of a telephone line into which is plugged a modem employing band superposition transmission, the modem sending a send signal on the telephone line and receiving from this line a digitized reception signal, wherein said method includes the following steps:

a step for providing a parameter of a transfer function of the send signal on the reception signal, said parameter being characteristic of the presence of at least the said apparatus on the line, a control step for controlling the interruption of the exchanges of signals of the modem on the line, the said control being dependent on the said parameter of the transfer function.

2. Method according to claim 1, wherein the step for providing the parameter of the transfer function of the send signal on the reception signal comprises a step of estimating the static gain of the transfer function and a step of determining the sign of the estimated static gain.

3. Method according to claim 2, wherein the step of estimating the static gain of the transfer function comprises a step of calculating the coefficients of the transfer function implementing an identification algorithm of Kalman or RLS type or a method of least squares.

4. Method according to claim 1, wherein the method of detection is performed continuously during the phase of modem data exchange with the telephone line.

5. Digital device for detecting the hold by an apparatus of a telephone line into which is plugged a modem employing band superposition transmission, the modem sending a send signal on the telephone line and receiving from this line a digitized reception signal, wherein said device comprises:

a means for providing a parameter of a transfer function of the send signal on the reception signal, said parameter being characteristic of the presence of at least the said apparatus on the line, control means for controlling the interruption of exchanges of signals of the modem on the line, the said control being dependent on the said parameter of the transfer function.

6. Device according to claim 5, wherein said means comprises a processor implementing a step of estimating the static gain of the transfer function and a step of determining the sign of the estimated static gain.

7. Device according to claim 6, wherein the step of estimating the static gain of the transfer function comprises a step of calculating the coefficients of the transfer function implementing an identification algorithm of Kalman or RLS type or a method of least squares.

8. Device according to claim 5, wherein said device includes a means for disconnecting the modem from the line when said device sends an indication signal that the line is requested by the apparatus plugged in parallel.

9. Band superposition transmission modem, wherein said modem includes a detection device according to claim 5.

10. Server of an Internet network access provider, wherein said server comprises a modem according to claim 9.

11. Server of an Internet network access provider, wherein said server comprises a device according to claim 5.

* * * * *